A. S. ANDERSON.
VEHICLE TIRE JACKET.
APPLICATION FILED APR. 3, 1916.
1,228,355.
Patented May 29, 1917.
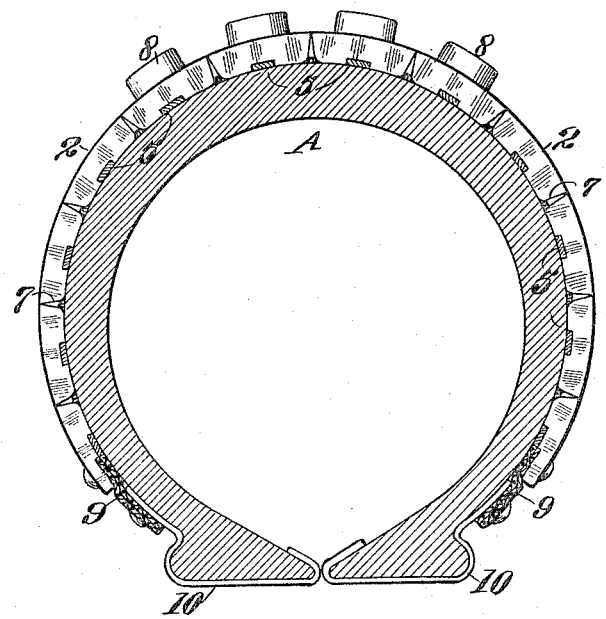
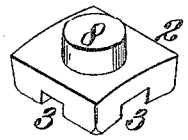
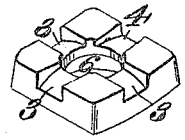
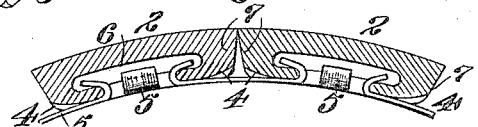
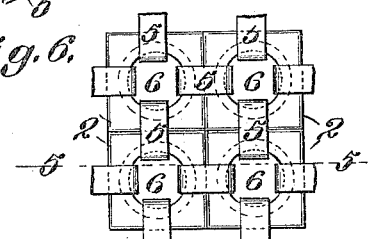
WITNESSES:
Charles Rokles
Thos Castberg
INVENTOR
Andrew S. Anderson
BY Strong & Townsend
ATTORNEYS

UNITED STATES PATENT OFFICE.

ANDREW S. ANDERSON, OF OAKLAND, CALIFORNIA, ASSIGNOR OF ONE-HALF TO ROE L. SMITH, OF OAKLAND, CALIFORNIA.

VEHICLE-TIRE JACKET.

1,228,355.  Specification of Letters Patent.  Patented May 29, 1917.

Application filed April 3, 1916. Serial No. 88,519.

*To all whom it may concern:*

Be it known that I, ANDREW S. ANDERSON, a citizen of the United States, residing at Oakland, in the county of Alameda and State of California, have invented new and useful Improvements in Vehicle-Tire Jackets, of which the following is a specification.

My invention relates to a jacket for vehicle tires, which is designed especially to provide a more adherent surface in case of slippery roads; and also to provide against punctures which are liable to occur in air-inflated tires.

It consists in the combination of flexible shoes linked together to form a surface of sufficient area to cover the tread of the tire and the combination therewith of supplemental projections adapted to form a tread.

In the accompanying drawings which are referred to as illustrating my invention—

Figure 1 is a transverse section of a tire, showing the jacket sections in position.

Fig. 2 is a perspective view of one element of such a tire, showing the projecting lug.

Fig. 3 is a similar view without the lug.

Fig. 4 is a perspective view of the element shown in Fig. 3 showing the inner side thereof.

Fig. 5 is a transverse section through line 5—5 of Fig. 6.

Fig. 6 is an inner plan view showing the union of four of the jacket plates.

Fig. 7 is an edge view of one of said plates having the transverse channels omitted.

In the illustration of my invention, A is an elastic tire capable of being inflated and secured in the rim of a vehicle such as an automobile. In order to protect such tire from punctures by sharp instruments over which it may pass and to prolong the life of the tire I have shown a jacket formed preferably of rectangular sections 2. These may be made of metal or any suitable material and may be slightly convex on their outside periphery and substantially concentric with the curvature of the tire. The inner faces of these blocks are formed with transverse channels 3 and the interior of these channels is beveled or cut-away with rounded corners, as shown at 4.

When these blocks are to be assembled they are engaged by elastic strips 5, the ends of which are curved inwardly so as to fit around the edges of the openings 6 so as to hook therein. The meeting edges of the blocks are beveled or cut-away, as shown at 7, so that when they lie together upon a flat surface the inner angles will be separated from each other, but the angles are such that they permit the blocks to be arranged in a curve around the periphery of the tire and leave some independent movement of the blocks and enables them to conform to the shape of the tire under the influence of its cushion action, while the outer edges of the blocks meet to form a substantially impervious structure which extends around the tread of the tire sufficiently far to protect it from injuries by contact.

In order to make such blocks more secure against slipping on treacherous surfaces, I have shown lugs or projections 8 formed centrally of the blocks and projecting outwardly sufficiently to provide an adhering, non-slipping surface upon the ground. When a series of such blocks have been united together they will form a flexible armor which may extend as far around the tire as desired.

As a means of attaching this jacket to the tire I have shown a flexible fabric material 9 riveted to the inner end of the edge plate, this plate being cut away, as shown in Fig. 1, to allow the flexible connection to be riveted to it without undue projection. The opposite and projecting edge of this flexible portion is riveted to a metallic strip 10 which is bent to such shape as to engage the beads of the tire casing, which beads in turn engage the rim of the wheel and thus lock said tire in place in the well-known manner. The shoe or armor is thus prevented from slipping or losing its position on the tire.

The curvature of the channels at the ends, as at 4, is such that while the connecting strips 5 lie flat against the tire casing the curvature of the ends of these channels allows the sections to have a rocking motion and adjust themselves easily to pressure upon any part.

Having thus described my invention, what I claim and desire to secure by Letters Patent is—

1. A tire jacket embodying a series of plates having chambers formed on their inner faces and having the walls defining the chambers recessed to form inwardly extending projections, and connecting means for the plates having hooks on their ends engaged with said projections with the hook terminals located at points between the inner and outer faces of the plates.

2. A tire protecting armor consisting of rectangular imperforate plates with beveled edges adapted to lie in contact the inner surface of said plates being provided with central recesses and transverse channels, elastic strips extending across the junction of said plates within said channels and having their ends formed into hooks to engage in the recesses of said plates.

3. An armor jacket for tires consisting of a series of square imperforable beveled edge plates lying side by side having transverse channels upon the lower interior faces, and central, divergently countersunk openings in the latter, and hook-shaped, elastic plates fitting in the channels connecting each plate with the one adjacent and having inturned hooks engaging the central spaces.

4. A tire protecting armor composed of rectangular sections linked together to form a band, said sections having solid outer surfaces and central divergent depressions in their inner surfaces, spring strips, the inner ends of which engage the edges of said depressions, and channels extending to the edges of the sections, the bottoms of the channels forming curved faces upon which the springs are yieldably seated.

5. A flexible tire jacket comprising a plurality of plates having solid outer faces and recessed inner faces, the latter further having channels leading therefrom the bottom faces of which curve outwardly toward the edges of the plates, and connecting strips seating in the plate channels and having hooked terminals interlocking in the plate recesses for flexibly connecting the plates.

In testimony whereof I have hereunto set my hand in the presence of two subscribing witnesses.

ANDREW S. ANDERSON.

Witnesses:
 JOHN H. HERRING,
 W. W. HEALEY.

Copies of this patent may be obtained for five cents each, by addressing the "Commissioner of Patents, Washington, D. C."